United States Patent [19]
Schlosser et al.

[11] Patent Number: 5,941,229
[45] Date of Patent: Aug. 24, 1999

[54] BARBECUE CART AND SIDE WORK SHELF ASSEMBLY

[75] Inventors: Erich J. Schlosser, Barrington; J. Michael Alden, Palatine; Robert T. Stephen, Barrington; James C. Stephen, Arlington Heights, all of Ill.

[73] Assignee: Weber Stephen Products Co., Palatine, Ill.

[21] Appl. No.: 08/694,693

[22] Filed: Aug. 9, 1996

[51] Int. Cl.[6] .................................................. A47J 37/00
[52] U.S. Cl. ......................... 126/41 R; 126/25 R; 126/50
[58] Field of Search ............................. 126/41 R, 25 R, 126/50; 248/250

[56] References Cited

U.S. PATENT DOCUMENTS

| | | |
|---|---|---|
| D. 219,629 | 12/1970 | Koziol . |
| D. 293,067 | 12/1987 | Stephen et al. . |
| D. 316,355 | 4/1991 | Stephen et al. . |
| D. 325,316 | 4/1992 | Parent et al. . |
| 2,541,528 | 2/1951 | McAvoy . |
| 3,391,682 | 7/1968 | King et al. . |
| 3,586,518 | 6/1971 | Folmar . |
| 3,789,822 | 2/1974 | Schantz .................................. 126/41 R |
| 4,054,123 | 10/1977 | Corter . |
| 4,677,964 | 7/1987 | Lohmeyer et al. . |
| 4,696,282 | 9/1987 | Incitti . |
| 4,718,399 | 1/1988 | Shepherd . |
| 4,886,045 | 12/1989 | Ducate, Jr. et al. . |
| 5,050,577 | 9/1991 | Baynes et al. . |
| 5,070,776 | 12/1991 | Schlosser et al. . |
| 5,072,718 | 12/1991 | Seal . |
| 5,076,256 | 12/1991 | Raymer et al. . |
| 5,076,257 | 12/1991 | Raymer et al. . |
| 5,090,398 | 2/1992 | Raymer et al. . |
| 5,104,080 | 4/1992 | Berger ...................................... 248/250 |
| 5,109,834 | 5/1992 | Collins et al. . |
| 5,140,973 | 8/1992 | Home . |
| 5,203,317 | 4/1993 | James . |
| 5,323,758 | 6/1994 | Minshall et al. . |
| 5,341,793 | 8/1994 | Brown . |
| 5,452,707 | 9/1995 | Harris et al. . |
| 5,531,464 | 7/1996 | Maurer et al. ......................... 280/47.35 |
| 5,632,265 | 5/1997 | Koziol ...................................... 126/30 |

*Primary Examiner*—Larry Jones
*Attorney, Agent, or Firm*—Wallenstein & Wagner, Ltd.

[57] ABSTRACT

A barbecue grill including a cart with attached side work shelves is disclosed. The cart having a first frame with a plurality of vertical members joined by weldment to least an upper and lower first horizontal members, and a second frame with a plurality of vertical members joined by weldment to at least an upper and lower second horizontal members, and at least two transverse cross members joining the first frame in spaced relation to the second frame. The attachment of the side work shelves to a support member of the cart, including at least one generally vertical projection on either the support member or the work shelf, and at least one generally vertical receiver on the other, whereby the projection and receiver cooperatively dimensioned such that the projection is removably inserted in the receiver to provide cantilever support of the work shelf. The work shelf of the barbecue grill having a panel with a peripheral margin and a thickness, and a support frame underlying and supporting the panel, with a cap ring having an inwardly turned lip and a skirt depending from the lip, such that at least a portion of the lip extends over at least a portion of the peripheral margin of the panel and the skirt extends toward the support frame to at least a point whereby the skirt covers the thickness of the panel.

36 Claims, 3 Drawing Sheets

BARBECUE CART AND SIDE WORK SHELF ASSEMBLY

TECHNICAL FIELD

The present invention relates generally to barbecue grills, and more particularly, to support frames and accessory work surfaces for gas barbecue grills.

BACKGROUND OF THE INVENTION

Gas grills have become very popular as outdoor portable cooking devices. Gas barbecue grills generally consist of a cooking chamber supported by a support frame. Portable gas grills employ a cart-type support frame for the cooking chamber that is supported on wheels and has a cooking chamber thereon. These support structures are usually made of square tubing sections connected together with fasteners, such as bolts and the like. These support frames are often equipped to have a work table surface adjacent to the cooking chamber, or an auxiliary burner. For example, U.S. Pat. No. 4,677,964 discloses a portable barbecue grill and cart assembly with a side table and a side burner. Portable gas grills are usually packaged with the cart disassembled in order to reduce the packaging size, requiring the purchaser to assemble the tubing sections and attach the cooking chamber and any side tables or side burner.

One of the problems with this type of grill is the difficulty for the purchaser or retail seller of such grills in assembling tubing sections into a cart and including any side accessories. Such assembly typically requires much time following detailed instructions, and packaging of a number of various fasteners such as bolts and brackets. Further, such assembly of the portable grills results in a cart structure that is susceptible to poorly tightened fasteners and/or attachment joints which may loosen, resulting in loss of the integrity of the grill support or the integrity of the side accessory attachment.

Further, when side accessories are attached to and extend from the cart frame, using conventional fastening structures may result in marginal load-bearing capacity of the side table. To avoid this problem, various support arms which extend diagonally from the outer underside of the side table to the support frame have been employed. The result of these designs is a cart structure that has exposed unsightly support members, and which has more parts and connections, making it even more difficult to assemble.

Therefore, there is a need for a barbecue grill having a cart with solid construction and ease of assembly, and which is suitable for compact packaging. Additionally, there is a need for a barbecue grill with a sturdy side table construction, which is also easily assembled.

SUMMARY OF THE INVENTION

A cart for a portable barbecue grill is provided with a first frame having at least two vertical members joined by weldment to at least an upper and a lower first horizontal member, and a second frame having at least two vertical members joined by weldment to at least an upper and a lower second horizontal member. Transverse cross members join the first frame in spaced relation to the second frame. The barbecue grill cart also has protrusions extending from one of either the first frames or the transverse cross members, and a receptacle for receiving the protrusion on the other of the frame or transverse cross member.

A work shelf for a barbecue grill is provided as an attachment to a support member of the grill. The grill has at least one generally vertical projection on either the grill support member or the work shelf, and at least one generally vertical receiver on the other of either the support member or the work shelf. The projection and receiver are cooperatively dimensioned such that the projection is removably inserted in the receiver to provide cantilever support of the work shelf.

A barbecue grill work shelf is provided with a panel having a peripheral margin and a thickness, and a support frame underlying and supporting the panel. The work shelf has a cap ring having an inwardly turned lip and a skirt depending from the lip, at least a portion of the lip extending over at least a portion of the peripheral margin of the panel. The skirt extends toward the support frame to at least a point whereby the skirt covers the thickness of the panel, and preferably extending further to cover the frame. The frame of the work shelf presents upper surface portions positioned below the lip, such that the at least a portion of the peripheral margin of the panel is secured between the lip and the upper surface portions of the support frame. The work shelf optionally includes a lid pivotally connected to the cap ring and dimensioned to cover at least a portion of the panel, the lid being pivotally attached to at least one extending wall of the cap ring. The work shelf is alternatively adapted to accommodate a side burner, in which case a fuel supply valve is secured to the work shelf, such that the valve has a valve stem which extends through an opening in the cap ring skirt and has a valve control knob positioned on the valve stem outward of the skirt or in a recess of the skirt.

Other advantages and aspects of the present invention will become apparent upon reading the following description of the drawings and detailed description of the invention.

DETAILED DESCRIPTION

Figure 1:
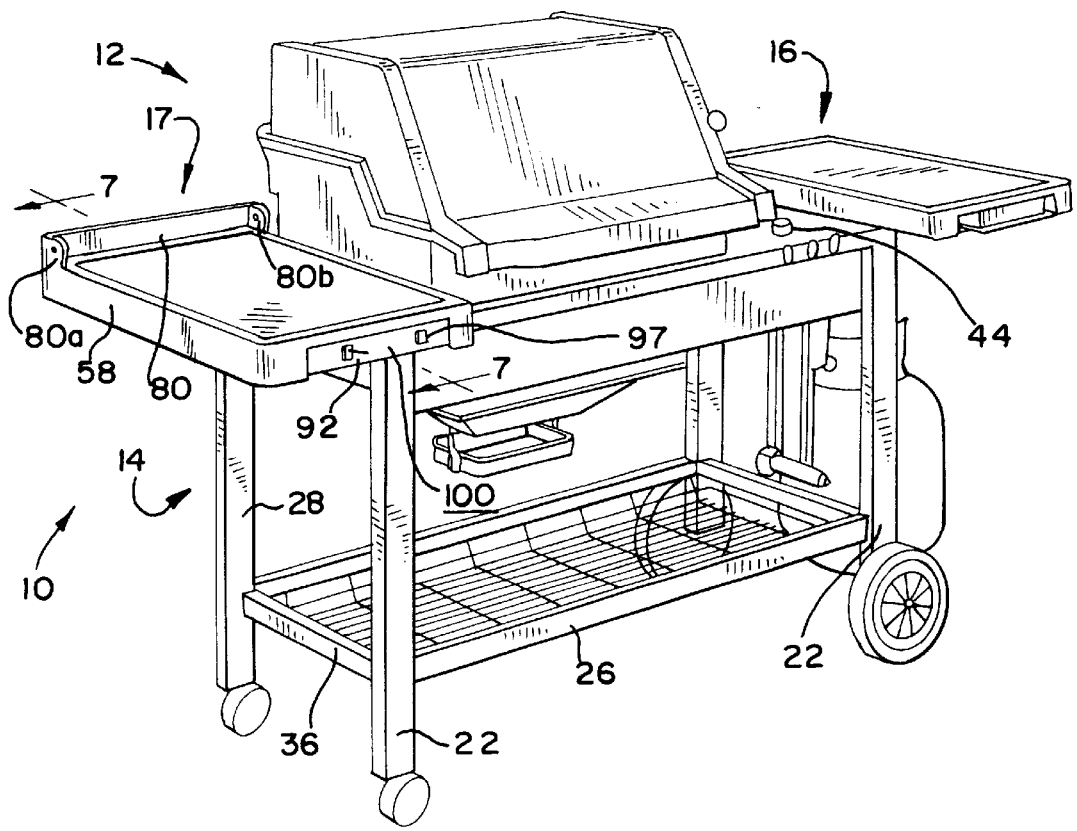
FIG. 1 is a perspective view of an exemplary barbecue grill made in accordance with the present invention.
Figure 2:
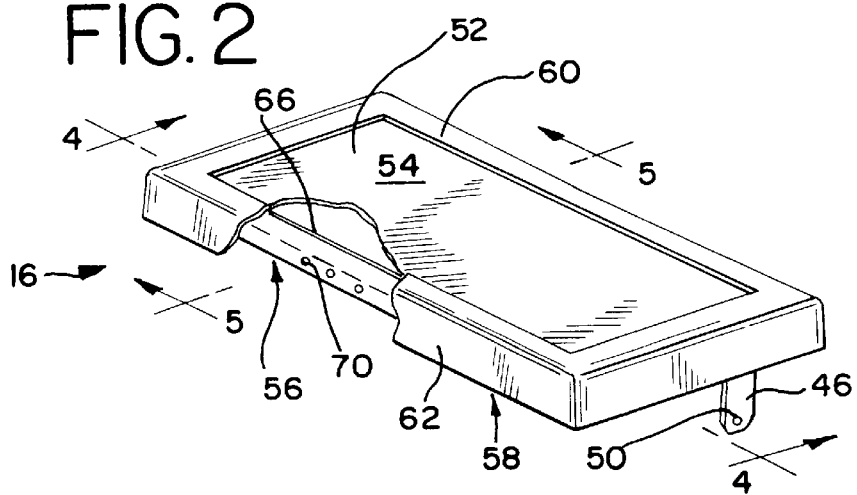
FIG. 2 is a rear perspective view of the work shelf of the barbecue grill of FIG. 1 with a partial cut-away view.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

As illustrated in FIG. 1, the barbecue grill 10 of the present invention has a cooking chamber 12 supported in a support frame or cart 14. The grill 10 includes side work tables 16 and 17 attached to the cart 14 adjacent the cooking chamber 12. The tables 16 and 17 are supported on and extend beyond the cart 14.

The cart 14 is preferably constructed of tubing, and has two independent frame structures, a front frame member 18 and a rear frame member 20. The front frame member 18 has two front vertical members 22a, 22b. Vertical members 22a and 22b are welded to an upper horizontal member 24, and a lower horizontal member 26. The rear frame member 20 is similarly constructed of rear vertical members 28a, 28b which are welded to an upper horizontal member 30, and a lower horizontal member 32. According to this construction, the cart 14 has a front and a rear frame structure 18, 20 which are pre-assembled when the grill is prepared for packaging, and which have a solid structure which requires no fasteners or brackets for connecting vertical frame members to horizontal frame members. Accordingly, assembly of the cart 14 requires only securing the front frame 18 to the rear frame 20.

Figure 3:
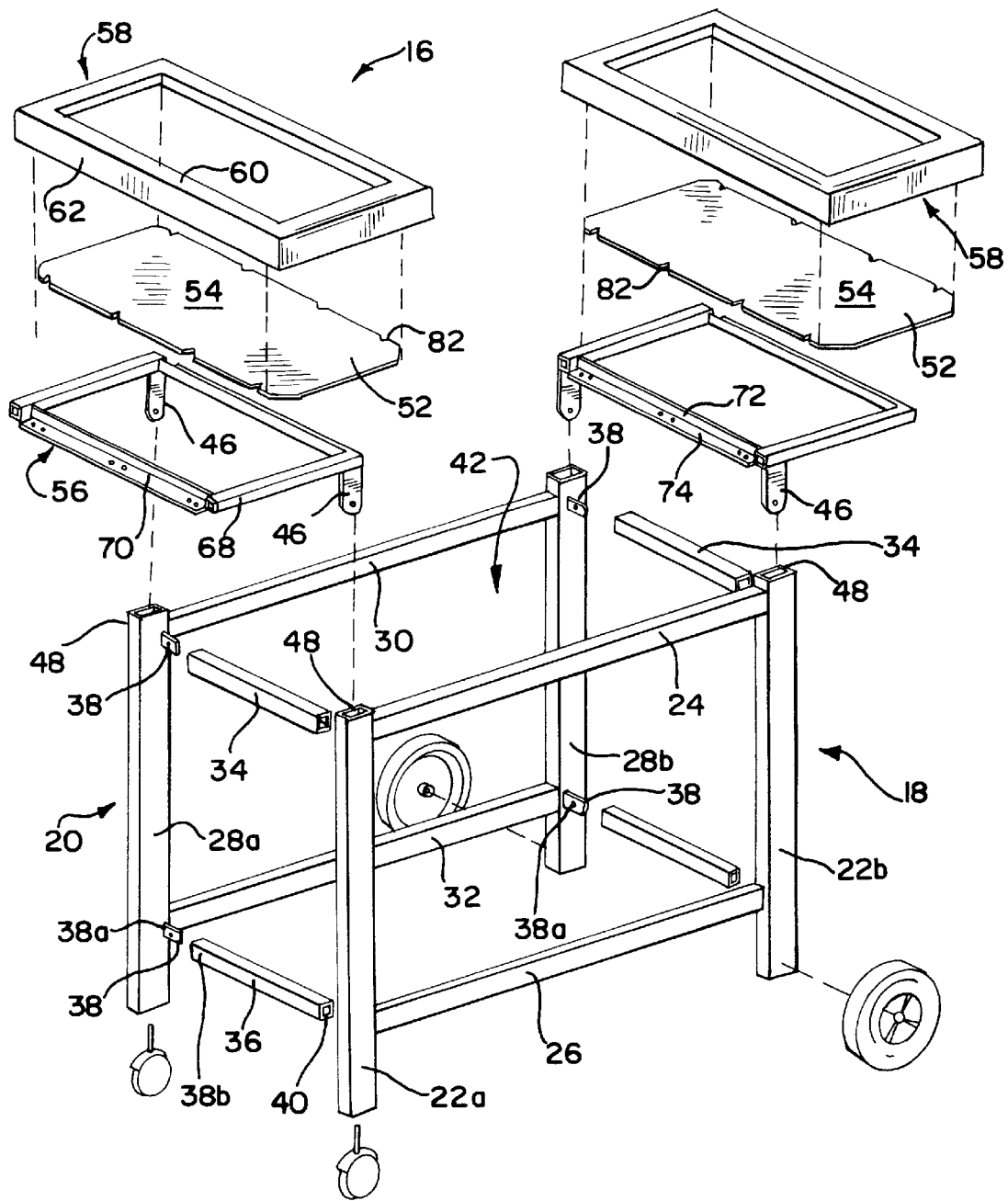
FIG. 3 is an exploded view of the support frame and work shelves of the barbecue grill of FIG. 1.
Figure 4:
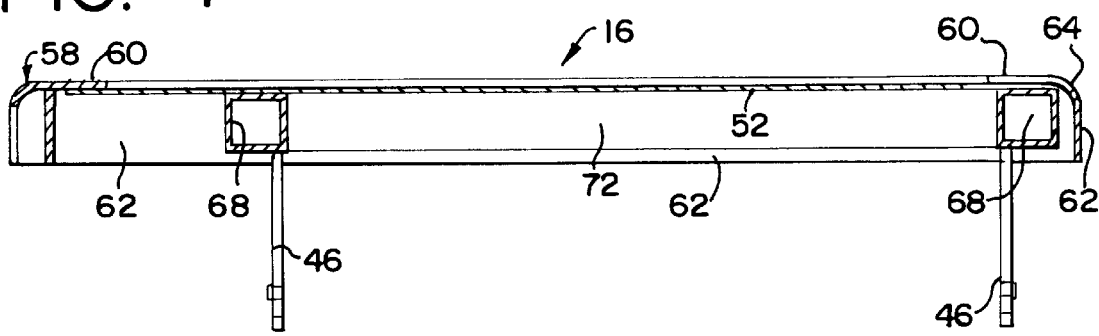
FIG. 4 is a sectional view of the work shelf of FIG. 2, taken along line 4—4 of FIG. 2.

The front and rear frame members 18, 20 are joined in spaced relation by two upper cross members 34, and two lower cross members 36. The upper and lower cross members 34, 36 are attached to the front and rear frame members 18, 20 by mechanical engagement of a protrusion 38 on the frame members 18, 20 received by a receptacle 40 of the cross members 34, 36. The receptacle 40 shown in FIG. 1 is defined by the hollow end of the tubular cross members 34, 36. Alternatively, the cross member may include a separate sheath or a matching recess or protrusion suitable for mating with the frame protrusion. As another alternative, the protrusion 38 may be located at the ends of the cross members 34, 36, with the receptacle being located on the front and rear frame members 18, 20. The cart 14 also has a means for preventing the protrusion 38 from exiting the receptacle 40. As shown in FIG. 3, a hole 38a in the protrusion 38 cooperates with a similarly-aligned hole 38b in the cross member 34, 36 so that a fastener such as a screw may pass through the aligned holes 38a, 38b. A variety of other means for securement (not shown) are available, including spring-biased clips, cotter pins or expandable inserts.

The front and rear frame members 18, 20 are secured together by the cross members 34, 36, such that the cart 14 has an inner space 42 suitable for receiving the cooking chamber 12, and optionally the grill controls 44.

Figure 6:
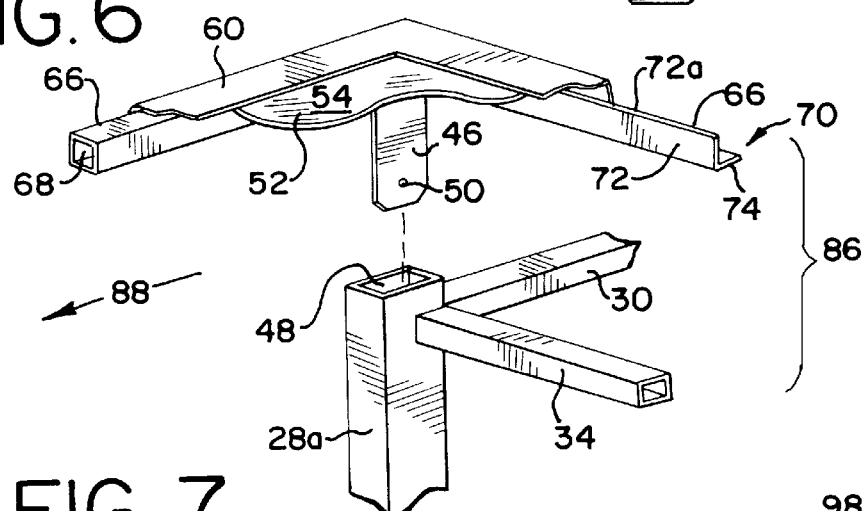
FIG. 6 is an exploded partial view of the support frame and work shelf of the barbecue grill of FIG. 1.

The grill 10 of the present invention also provides for side work tables 16 and 17 extending outward from the cart 14 and beyond the inner space 42. The side work tables 16 and 17 are secured to the cart by a support assembly 86 (see FIG. 6) in a manner which provides: sturdy cantilever support of the side tables 16 and 17; being optionally removably attached; and, without the need for a diagonal support under the side tables 16 and 17 or a need for extending the upper horizontal frame members 24, 30 beyond the vertical frame members 22, 28.

The cantilever support of the work tables 16 and 17 is provided by insertion of a vertical projection 46 into a receiver 48. Preferably, the projection 46 extends from the underside of the work tables 16 and 17. Preferably, the receiver 48 is defined by an open end of the tubing of the vertical frame members 22, 28. In the preferred embodiment, the projection 46 is an elongated flat piece of metal welded to the side table 16 and protruding downward to an extent sufficient to achieve cantilever support. The open end of the vertical frame members 22, 28 is rectangular, to provide easy alignment and insertion of the projection 46 within the receiver 48. For example, projection 46 extends approximately 4–6 inches into the receiver 48. Preferably, a rectangular flat metal projection 46 is inserted such that the weight of the cantilever attachment is supported across the width of its cross-section, rather than being merely supported across its thickness. In other words, the flat rectangular metal projection 46 is inserted into the receiver with the thickest portion of the projection 46 (i.e., the width of the rectangular piece) being in the direction 88 (FIG. 6) of the extension of the side table 16.

The grill 10 includes a means for locking the projection 46 within the receiver 48, such as by inserting a fastener through a hole 50 in the projection 46 when aligned with a similar hole (not shown) in the receiver 48. A variety of other means for locking (not shown) are available, including spring-biased clips, expandable members, or mating projections.

Figure 5:
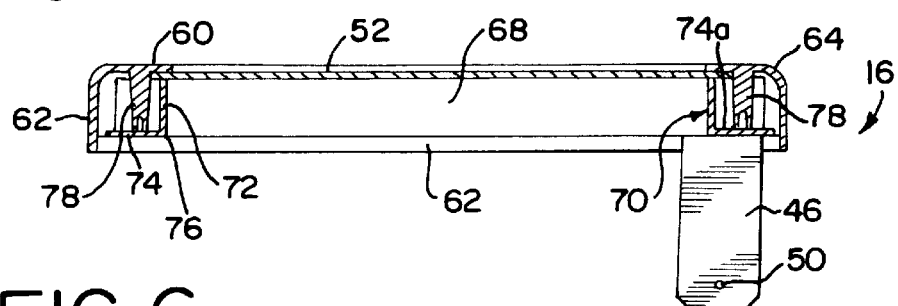
FIG. 5 is a sectional view of the work shelf of FIG. 2, taken along 5—5 of FIG. 2.

The work shelves 16 and 17 have a panel 52 with an upper surface 54 suitable for use as a table for preparing food or supporting items. The work shelves 16, 17 are optionally adapted to hold a side burner assembly (not shown). The work tables 16 and 17 have a support frame 56 which underlies the panel 52, and a cap ring 58. The cap ring 58 has a lip 60 and a skirt 62. The lip 60 extends inward, toward the center of the work tables 16 and 17, while the skirt 62 extends downward to cover the frame 56 from view. The cap ring 58 is preferably constructed of one piece that includes the lip 60 integrally joined with the skirt 62 at an angle 64 (FIG. 5). The lip 60 of the cap ring 58 alternatively has at least one recess (not shown) which extends from the panel 52 to provide at least one drain passage for rain water to drain from the panel 52.

Figure 7:
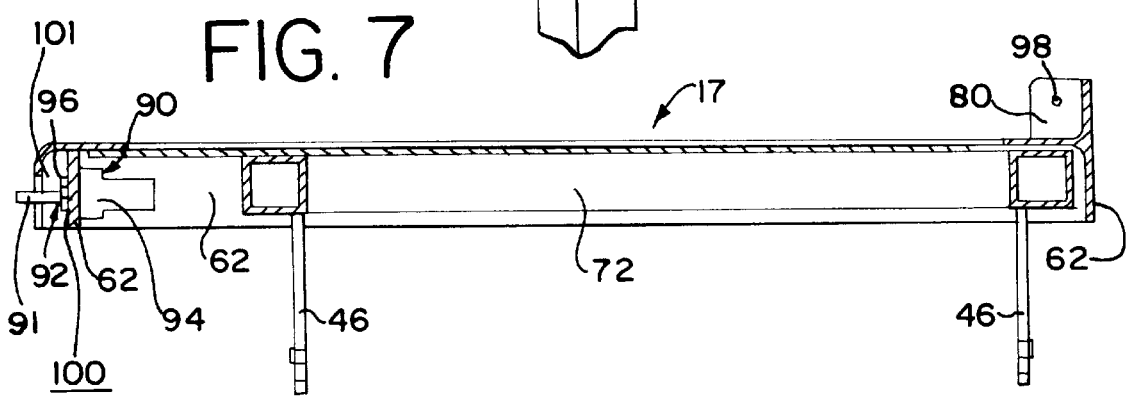
FIG. 7 is a cross-sectional view of another work table of FIG. 1, taken along 7—7 of FIG. 1.

FIG. 7 shows an optional embodiment of the skirt 62 of the cap ring 58 which includes an opening or hole for permitting passage of a fuel control mechanism 90 mounted on an outer surface 100 within a recess 101 of the skirt 62. For example, when the side table 17 includes a side burner, it is desirable for the side table 17 to have a fuel control valve 94 with a valve stem 92 extending through the cap ring skirt 62. The fuel valve 94 is positioned against an inner surface of the skirt 62, preferably secured by a threaded nut 96 fastened to the valve stem 92 on the outer surface 100 of the skirt 62. Further, a burner starter control 97 (see FIG. 1) may also pass through the skirt 62 to be mounted on the outer surface 100.

The cap ring 58 is preferably made of cast metal, such as cast aluminum, but may also be made of molded material such as plastic. The cap ring may also be stamped from sheet metal. In an alternative embodiment (FIG. 7) which provides for attachment of a cover, the cap ring 58 has at least one integrally attached wall 80, extending upward from the lip 60 and skirt 62. The wall 80 includes a means for securing a hinged panel cover (not shown). Preferably, two opposed end portions 80a and 80b of wall 80 (FIG. 1) are positioned at the back of the table 17 and formed as continuation of the cast construction of the cap ring 58. The walls 80 include holes 98 suitable for receiving a hinge pin (not shown), or similar hinge attachment means, for attaching the panel cover which rotates about the hinge attachment.

The support frame 56 has an upper surface 66 which engages with the underside of the panel 52, preferably proximate a peripheral margin of the panel 52, and more preferably directly underneath the lip 60 of the cap ring 58. In this arrangement, the panel 52 is secured in position by being engaged between the cap ring lip 60 and the upper surface 66 of the support frame 56. The support frame 56 is constructed of two sections of tubing 68 which are spaced apart and connected to each other by two transverse members 70. The tubing 68 and the transverse members 70 of the frame 56 are preferably connected by a weld or a similar permanent connection.

In the preferred embodiment, the transverse members 70 of the frame 56 are generally L-shaped in cross-section, with a first portion 72 and a second portion 74 integrally connected together by a bend or angle 76. The first portion 72 has an upper surface 72a which forms at least a part of the upper surface 66 of the frame 56 engaged with the underside of the panel 52. The second portion 74 has a surface 74a which engages with the cap ring 58 for securement thereto. The remaining portion of the upper surface 66 engaged with the panel 52 is formed by the upper surface of the tubing 68.

The frame 56 is secured to the cap ring 58 by any suitable means, such as by passing screw-like fasteners through the frame 56 and into the cap ring 58. In the embodiment shown in FIG. 5, the frame 56 is secured to the cap ring 58 by passing screws (not shown) through the transverse member 70 and into bosses 78 which extend from the underside of the cap ring 58. The bosses 78 extend downward from the lip 60 of the cap ring 58 to a depth approximately equal to the length of the first portion 72 of the transverse member 70. The bosses 78 are preferably formed as part of the cast construction of the cap ring 58 and define blind holes with internal threading. The panel 52 has cut-away or void areas 82 in the areas where the bosses 78 extend toward the frame 56.

The cap ring 58 and the support frame 56 may be secured together by alternative means (not shown). For example, the second portion 74 of the transverse member 70 may attach to a vertical part of the cap ring 58, such as being attached to the skirt 62. Also, a threaded projection may be mounted on the cap ring 58, or a clip may be mounted to the cap ring 58 to engage the underside of the frame 56.

The cantilever support assembly 86 is integrally attached to the frame 56. In the preferred embodiment, the vertical projection 46 is welded to the frame tubing 68 and extends downward, away from the panel 52. Alternatively, the projection 46 may be secured to the cap ring 58, such as on the inner surface of the skirt 62, the frame then being secured to the support assembly 86 by being fastened to the cap ring 58. Downward projections or receptacles may be incorporated into the unitary cap ring 58. In the latter case, a mating upward projection would then be provided on a grill support member.

Because of the cantilever-type securement of the side tables 16, 17 to the cart 14, there is no need for any horizontal extensions of the upper horizontal frame members (such as upper member 24) of the cart 14, or for any underside diagonal support brackets. Therefore, the side tables 16, 17 may be larger than conventional side tables, and protrude beyond the side and front of the frame of the cart 14 (FIG. 1).

While the specific embodiments have been illustrated and described, numerous modifications come to mind without significantly departing from the spirit of the invention and the scope of protection is only limited by the scope of the accompanying Claims.

We claim:

1. A barbecue grill having a cooking chamber and a support member therefor and a work shelf, further comprising:
   at least one generally vertical projection on one of either the support member or the work shelf; and,
   at least one generally vertical receiver on the other of either the support member or the work shelf, the projection and receiver cooperatively dimensioned such that the projection is removably inserted in the receiver to provide cantilever support of the work shelf, wherein the receiver is a vertical channel, the projection being at least partially received into said channel.

2. The barbecue grill of claim 1, wherein the projection is blade shaped and the channel is rectangular in cross section.

3. The barbecue grill of claim 1, wherein the projection and the channel being arcuate in cross section.

4. The barbecue grill of claim 1, wherein the projection is a tube.

5. A barbecue grill having a cooking chamber and a support member therefor and a work shelf, further comprising:
   at least one generally vertical projection on one of either the support member or the work shelf; and,
   at least one generally vertical receiver on the other of either the support member or the work shelf, the projection and receiver cooperatively dimensioned such that the projection is removably inserted in the receiver to provide cantilever support of the work shelf, further comprising means for locking said projection within said receiver.

6. A work shelf for a barbecue grill, comprising:
   a panel having a peripheral margin and a thickness;
   a support frame underlying and supporting the panel and;
   a cap ring having an inwardly turned lip and a skirt depending from the lip, at least a portion of the lip extending over at least a portion of the peripheral margin of the panel, the skirt extending toward the support frame to at least a point whereby the skirt covers the thickness of the panel.

7. The work shelf according to claim 6, wherein the support frame presenting upper surface portions positioned below the lip such that the at least a portion of the peripheral margin of the panel is secured between the lip and the upper surface portions of the support frame.

8. The work shelf according to claim 6, having a means for locking the cap ring to the support frame.

9. The work shelf according to claim 6, wherein the support frame has at least one frame member having a means for engaging both an underside of the panel and at least a portion of the cap ring.

10. The work shelf according to claim 6, wherein the at least one frame member has a first surface engaged with the underside of the panel and a second surface engaged with the cap ring.

11. The work shelf according to claim 10, wherein the at least one frame member has a first side and a second side, the sides being integrally connected by an angle, the first side having the first surface engaged with the panel and the second side having the second surface engaged with the cap ring.

12. The work shelf according to claim 10, wherein the at least one frame member is a length of tubing.

13. The work shelf according to claim 12, wherein the cap ring is a molded polymer.

14. The work shelf according to claim 10, wherein the means for securing the cap ring to the support frame includes threaded blind openings on the cap ring suitable for receiving threaded fasteners extending from the support frame.

15. The work shelf according to claim 14, wherein the cap ring is cast metal.

16. The work shelf according to claim 14, wherein the cap ring is sheet metal.

17. The work shelf according to claim 10, wherein the peripheral margin of the panel includes void areas dimensioned to accommodate the means for securing the cap ring to the support frame.

18. The work shelf according to claim 6, wherein the lip and the skirt being formed integrally as one piece.

19. The work shelf according to claim 6, wherein the skirt extends to cover the support frame.

20. The work shelf according to claim 6, further comprising a burner assembly being positioned in the panel.

21. The work shelf according to claim 20, further comprising a lid being pivotally connected to the cap ring and dimensioned to cover the burner assembly.

22. The work shelf according to claim 21, wherein the cap ring has an extending wall adapted to pivotally connect the cover.

23. The work shelf according to claim 6, wherein cap ring skirt includes at least one opening, and a fuel supply control passing through said transverse opening.

24. The work shelf according to claim 6, wherein said support frame includes at least one opening, and a fuel supply conduit passing through said transverse opening.

25. The work shelf according to claim 6, wherein a fuel supply valve is secured to the work shelf, the valve having a valve stem which extends through an opening in the cap ring skirt and a valve control positioned on the valve stem outward of the skirt.

26. A barbecue grill comprising:
a cart having a removably attached work shelf;
the cart having a first frame with a plurality of vertical members joined by weldment to least an upper and lower first horizontal members, a second frame with a plurality of vertical members joined by weldment to at least an upper and lower second horizontal members, at least two transverse cross members joining the first frame and in spaced relation to the second frame;
at least one generally vertical projection on one of either the cart or the work shelf, and at least one generally vertical receiver on the other of either the cart or the work shelf, the projection and receiver cooperatively dimensioned such that the projection is removably inserted in the receiver to provide cantilever support of the work shelf.

27. The grill of claim 26, wherein at least one of the plurality of vertical members of the first frame is tubular with an open end, the open end defining the receiver.

28. The grill of claim 26, further comprising a means for preventing the projection from exiting the receiver.

29. The grill of claim 26, wherein the work shelf further comprises:
a panel having a peripheral margin and a thickness;
a support frame underlying and supporting the panel and;
a cap ring having an inwardly turned lip and a skirt depending from the lip, at least a portion of the lip extending over at least a portion of the peripheral margin of the panel, the skirt extending toward the support frame to at least a point whereby the skirt covers the thickness of the panel.

30. The grill of claim 29, wherein at least one of the plurality of vertical members of the first frame is tubular with an upper open end, the open end defining the receiver.

31. The grill of claim 29, wherein a lid is pivotally connected to the cap ring and dimensioned to cover at least a portion of the panel.

32. The grill according to claim 31, wherein the cap ring has an extending wall adapted to pivotally connect the cover.

33. A barbecue grill having a cooking chamber and a support member therefor and a work shelf, further comprising:
at least one generally vertical projection on one of either the support member or the work shelf and;
at least one generally vertical receiver on the other of either the support member or the work shelf, the projection and receiver cooperatively dimensioned such that the projection is removably inserted in the receiver to provide cantilever support of the work shelf;
the work shelf further comprising a panel having a peripheral margin and a thickness;
a support frame underlying and supporting the panel and;
a cap ring having an inwardly turned lip and a skirt depending from the lip, at least a portion of the lip extending over at least a portion of the peripheral margin of the panel, the skirt extending toward the support frame to at least a point whereby the skirt covers the thickness of the panel.

34. A cart for a portable barbecue grill, comprising:
a first frame having a plurality of vertical members joined by weldment to least an upper and lower first horizontal members;
a second frame having a plurality of vertical members joined by weldment to at least an upper and lower second horizontal members and;
at least two transverse cross members joining the first frame in spaced relation to the second frame;
said cart having a work shelf comprising a panel having a peripheral margin and a thickness;
a support frame underlying and supporting the panel and;
a cap ring having an inwardly turned lip and a skirt depending from the lip, at least a portion of the lip extending over at least a portion of the peripheral margin of the panel, the skirt extending toward the support frame to at least a point whereby the skirt covers the thickness of the panel.

35. The cart according to claim 34, further comprising a protrusion extending from either the first frame or the cross member, and a receptacle for the projection being on the other of said first frame or cross member.

36. The cart according to claim 34 having a means for locking the cap ring to the support frame.

* * * * *